(12) United States Patent
Zosel et al.

(10) Patent No.: US 11,735,057 B2
(45) Date of Patent: Aug. 22, 2023

(54) TRANSPORT SYSTEM FOR PASSENGER TRANSPORTATION AND METHOD FOR OPERATING A TRANSPORT SYSTEM FOR PASSENGER TRANSPORTATION

(71) Applicant: Volocopter GmbH, Bruchsal (DE)

(72) Inventors: Alexander Zosel, Rheinstetten (DE); Florian Reuter, Dossenheim (DE)

(73) Assignee: Volocopter GmbH, Bruchsal (DE)

( * ) Notice: Subject to any disclaimer, the term of this patent is extended or adjusted under 35 U.S.C. 154(b) by 493 days.

(21) Appl. No.: 16/633,344

(22) PCT Filed: Jul. 24, 2017

(86) PCT No.: PCT/EP2017/068682
§ 371 (c)(1),
(2) Date: Jan. 23, 2020

(87) PCT Pub. No.: WO2019/020168
PCT Pub. Date: Jan. 31, 2019

(65) Prior Publication Data
US 2020/0168105 A1 May 28, 2020

(51) Int. Cl.
*G08G 5/00* (2006.01)
*G06K 19/07* (2006.01)
*G06Q 50/30* (2012.01)

(52) U.S. Cl.
CPC ....... *G08G 5/0043* (2013.01); *G06K 19/0723* (2013.01); *G06Q 50/30* (2013.01); *G08G 5/0069* (2013.01)

(58) Field of Classification Search
CPC .................................. G08G 5/00; G06K 19/07
See application file for complete search history.

(56) References Cited

U.S. PATENT DOCUMENTS

| | | | |
|---|---|---|---|
| 9,527,605 B1 | 12/2016 | Gentry et al. | |
| 2005/0230563 A1* | 10/2005 | Corcoran, III | G05D 1/104 244/175 |
| 2012/0116610 A1* | 5/2012 | Righi | G05D 1/0061 244/76 R |
| 2014/0032034 A1 | 1/2014 | Raptopoulos et al. | |
| 2015/0012154 A1* | 1/2015 | Senkel | B64C 27/20 701/4 |
| 2016/0140851 A1* | 5/2016 | Levy | G08G 5/0034 701/410 |

(Continued)

FOREIGN PATENT DOCUMENTS

| | | |
|---|---|---|
| WO | 2019020158 | 1/2019 |
| WO | 2019020162 | 1/2019 |

*Primary Examiner* — Kira Nguyen
(74) *Attorney, Agent, or Firm* — Volpe Koenig

(57) ABSTRACT

A method for operating a transport system for passenger transportation, including the following steps: providing a plurality of vertically taking-off and vertically landing aircraft for passengers; providing a plurality of handing facilities for the take-off and landing of aircraft, wherein each handling facility has parking spaces for a plurality of aircraft; setting-up air routes between the handing facilities so that each handing facility is connected to at least one further handling facility via an air route, wherein there is continuous air traffic of aircraft on the air routes, at least in one flight direction, with automated take-off, automated flight along the air routes, and automated landing.

25 Claims, 1 Drawing Sheet

(56) References Cited

U.S. PATENT DOCUMENTS

2016/0364989 A1    12/2016  Speasl et al.
2016/0368600 A1*   12/2016  Frolov .................... B64C 37/02
2017/0197710 A1     7/2017  Ma

* cited by examiner

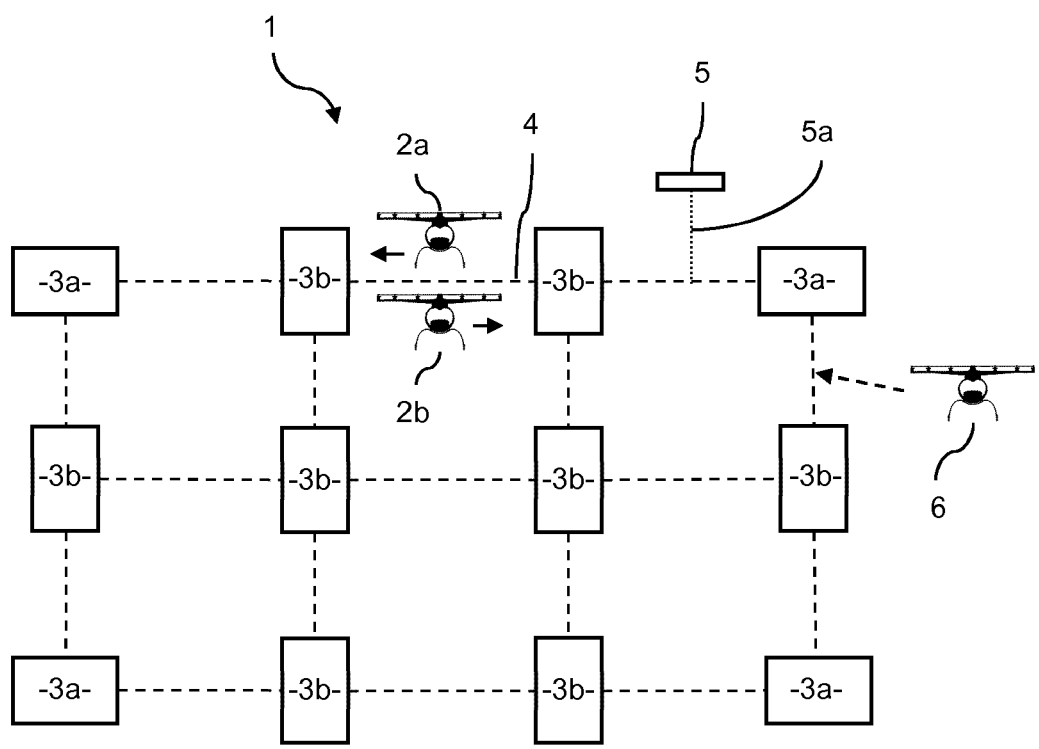

TRANSPORT SYSTEM FOR PASSENGER TRANSPORTATION AND METHOD FOR OPERATING A TRANSPORT SYSTEM FOR PASSENGER TRANSPORTATION

TECHNICAL FIELD

The invention relates to a method for operating a transport system for passenger transportation and to a transport system for passenger transportation.

BACKGROUND

The applicant is a pioneer in the field of manned air travel with electrically powered multicopters. These are vertical take-off and vertical landing aircraft which have a multiplicity of electrically powered rotors and are particularly easy and safe to fly. An automated flying operation (without a pilot) is also possible without problems. Such aircraft have the potential to revolutionize in particular inner-city traffic in the centers of urban conurbations in the future and to counteract a threat of traffic gridlock.

SUMMARY

Since the applicant has developed first aircraft of the specified type to the point of series-production readiness, the object of improving the abovementioned transport systems for passenger transportation, in particular in inner-city traffic and making it possible to increase the transportation capacity for passengers, in particular in inner-city traffic, on which object the invention is also based.

In particular when existing transport systems for passenger transportation, such as for example bus lines or train lines, no longer provide enough transportation capacity or when rapid transportation of passengers is desirable, it is necessary to implement extensions of the existing systems which have been cost-intensive up until now and which typically require a large amount of space. Therefore, there is a need for a transport system for passenger transportation which can be set up in addition to or as an alternative to the previously known transport systems.

This object is achieved by a method for operating a transport system for passenger transportation and by a transport system for passenger transportation having one or more features of the invention. Advantageous developments of the inventive concept are found below and in the claims.

The method according to the invention is preferably designed to be carried out by a transport system according to the invention, in particular an advantageous development thereof. The transport system according to the invention is preferably designed to carry out the method according to the invention, in particular an advantageous development.

A method according to the invention for operating a transport system for passenger transportation comprises providing a multiplicity of vertical take-off and vertical landing aircraft for passengers, providing a multiplicity of handling facilities for the take-off and the landing of aircraft, wherein each handling facility has parking locations for a multiplicity of aircraft, and configuring flight routes between the handling facilities so that each handling facility is connected to at least one further handling facility via a flight route. Continuous air traffic of aircraft occurs on the flight routes, at least in one flying direction, with automated take-off, automated flight along the flight route and automated landing.

An inventive transport system for passenger transportation has a multiplicity of vertical take-off and vertical landing aircraft for passengers, a multiplicity of handling facilities for the take-off and the landing of aircraft, wherein each handling facility has parking locations for a multiplicity of aircraft, a control system for the automated take-off and the automated landing of the aircraft at the handling facilities and for the automated steering of the aircraft along predefined flight routes between the handling facilities. The control system is designed for continuous flight traffic of the aircraft and the flight routes.

According to the invention there is accordingly provision to increase the transportation capacity for passengers by transporting passengers in aircraft on predefined flight routes between handling facilities. The provision of a control system for the automated take-off, the automated flight along the flight routes and the automated landing permits any passengers to use the transport system without particular knowledge or special training or approval for flying an aircraft being necessary. The continuous air traffic of aircraft permits the use of the transport system by a large number of passengers without booking or assignment of a specific aircraft for the transportation request of a specific passenger being absolutely necessary. For the passengers the use of the inventive transport system for passenger transportation is therefore comparable in principle with the use of a public local transport network which is ensured by buses or rail vehicles:

The provision of the multiplicity of handling facility permits access to the transport system at a multiplicity of locations, wherein the passenger reaches a desired destination handling facility via one or more successive flight routes by automated flight in one aircraft or a plurality of aircraft (by changing aircraft at handling facilities).

This transport system requires considerably less space in comparison with previously known transport systems for public local transportation, since there is no need for infrastructure such as for example rail lines, between the handling facilities along a flight route and also no existing infrastructure such as roads is additionally burdened with traffic. The requirement for space is simply made up of the area necessary for the handing facilities, wherein in an advantageous embodiment here existing structures can be used or multifunctional structures can be provided so that the required space is not used exclusively for the handling facility. This will be explained in more detail below.

Furthermore, the transport system according to the invention provides the advantage that it is possible to transport passengers rapidly and therefore also to achieve a high transportation rate. This is promoted by virtue of the fact that a flight route between two handling facility takes place in an optimum case as a "linear distance", i.e. with the shortest possible connection. The flight route between two handling facilities will typically be shorter, even when avoiding any obstacles or flight restriction zones, than a comparable connection in the road or rail network of an existing infrastructure.

Furthermore, the air traffic of the aircraft on the predefined flight routes is not subject to the limitations of road traffic, so that typically a considerably higher average speed can be achieved on the flight routes compared with the average speed of an analogous route in the existing road traffic network.

The combination of the multiplicity of handling facilities with the multiplicity of aircraft and the provision of continuous automated air traffic on the flight routes therefore makes it possible to expand capacity considerably or to provide alternatives to previously known transport systems for passenger transportation.

A standard take-off frequency with which aircraft take-off in a normal mode is advantageously predefined for the continuous flight operation for each handling facility, and/or in each case a standard distance which represents the distance of an aircraft from an aircraft which is flying immediately ahead on the respective flight route in a normal mode is respectively predefined for each flight route.

All the aircraft preferably fly at standard average flying speed. In particular, all the aircraft preferably have the same travel speed. As a result, it is easily possible to realize continuous flying operation, in particular to maintain a constant take-off frequency and/or a constant distance from the aircraft flying directly ahead.

Likewise, the scope of the invention includes the fact that the aircraft on different flight routes have different travel speeds, i.e. the typical flying speed excluding take-off manoeuvres and landing manoeuvres. Therefore, it can be advantageous for the sake of saving energy to predefine lower travel speeds on relatively short flight routes than on relatively long flight routes.

Different aircraft also have different travel speeds. This can result, for example, from different aircraft types, generally a travel speed which is advantageous in terms of the energy balance and/or flying stability is specified for a given aircraft type. When different aircraft types are used for aircraft it can therefore be advantageous to predefine different travel speeds. It can therefore be advantageous to predefine a constant take-off frequency at the destination point of a flight route and to adapt the take-off frequency to individual properties of the respective aircraft type, in particular to the travel speed and/or to the time which is required for take-off and landing.

Therefore, one or more parameters from the list
take-off frequency,
landing frequency,
distance from the aircraft flying directly ahead,
average distance on the flight route between the aircraft,
spatial average aircraft density on the flight route
chronological average density on the flight route,
is predefined a for continuous flight operation for at least one, preferably for all the flight routes.

As result, the normal mode, i.e. the mode which ensures a desired transportation capacity, except in the presence of faults, emergency situations or special conditions, can be easily predefined by the control system. The transportation capacity on a flight route results in a simple way from the number of aircraft flying on this flight route per unit of time multiplied by the passenger capacity, in particular number of seats on the aircraft.

The normal mode is therefore the typical operating mode of the transport system insofar as there are no exceptions such as, for example, an emergency situation or chronologically limited special regulations such as for example fleet movements, which will be explained in more detail further below.

As previously mentioned, each handling facility is connected to at least one further handing facility via a flight route. At least one subset of the flight routes, preferably all the flight routes, is advantageously embodied in a bidirectional fashion. This means that aircraft fly in both directions on a flight route between the two handling facilities which are connected via this flight route. This provides the advantage that passenger transportation is made possible in both directions along the flight route. Likewise, the scope of the invention includes the fact that, in particular in exceptional cases, aircraft fly in only one direction on a flight route between two handling facilities.

It is advantageous with the flight routes which are embodied in a bidirectional fashion that the same standard take-off frequency and/or the same standard distance is predefined in both directions. This provides the advantage that on average as result of such a flight route the number of aircraft does not change at the two handling facilities which are connected by the flight route, since averaged over time the same number of aircraft fly to a handling unit as well as away from this handling unit on this flight route.

The transport system according to the invention is preferably embodied as a closed network so that the handling facilities are connected to one another exclusively by flight routes. Likewise, the transport system can be embodied as a component of one or more superordinate and/or subordinate networks, wherein at least one of the handling facilities and/or at least one of the flight routes is connected to an external flight route or external handing facility of an external network. Likewise, individual external handling facilities can be connected to the transport network according to the invention via one or more flight routes, in particular in this way can be embedded in the transportation network according to the invention.

The transportation of the passengers occurs in the transport system according to the invention for passenger transportation by aircraft which fly in an automated fashion. In comparison with transportation by rail or road there is therefore an additional requirement for safety precautions since an interruption in the flying operation as result of "stopping" of an aircraft, i.e. an aircraft staying in a positionally fixed position, constantly requires energy. Furthermore, external influences, in particular strong airflows as result of a storm or storm gusts or adverse effects as result of precipitation such as hail, severe rainfall or snowfall, cause a temporary interruption in the air traffic on one or more flight routes. Therefore, the control system advantageously has a flight monitoring system, in particular as explained in more detail further below.

In one advantageous development of the method according to the invention in a normal mode at least one subset of the handing facilities, preferably all the handling facilities, therefore have in each case and continuously at least one emergency parking capacity at free parking locations for aircraft.

The emergency parking capacity which is always present therefore makes it possible in exceptional situations, for example due to the environmental influences described above, for flying operation to be interrupted in that aircraft duly land at the handling facility but subsequently temporarily do not take off again but are instead parked at a free parking location and preferably stay there until the interruption of the flying operation ends.

In this context, the emergency parking capacity at free parking locations preferably corresponds at least to one of the following conditions:

(a) Two handling facilities which are connected to a flight route have a common emergency capacity of free parking locations which corresponds at least to the number of aircraft flying on the flight route between the two handing facilities. The abovementioned condition is advantageously satisfied for each pair of handling facilities which are connected to a flight route.

This ensures that all the aircraft of a flight route can be parked at the handling facilities connected by this flight route, in order to interrupt the flying operation on this flight route.

(b) The emergency parking capacity of a handling facility corresponds to the number of all the aircraft flying simultaneously to this handling facility on a flight route of this handling facility.

This ensures that at any given point in time all the aircraft which are "in the air" can continue to move on the predefined flight route and can be parked at the envisaged destination handling facility.

This is easily ensured in that even when a handling facility is connected to a plurality of other handling facilities by a plurality of flight routes it is easily possible to interrupt the air traffic: for an interruption the take-off of further aircraft is prohibited. In contrast, the aircraft which are already on a flight route end the envisaged flight and find a parking facility at the respective destination handling facility on the basis of the abovementioned conditions.

(c) The emergency parking capacity corresponds to the sum of half of the number of all the aircraft which, on a flight route, are flying simultaneously to this handling facility and half of the number of all the aircraft which, on a flight route of this handling facility, are flying simultaneously away from this handling facility.

This condition permits rapid aborting of the flying operation on a flight route compared with the previously described procedure with respect to condition b): complying with the condition c) permits the further take-off of aircraft on the respective flight route to be prohibited in order to abort the flying operation, and the aircraft which are already on the flight route respectively fly to the nearer of the two handling stations which are connected to this flight route. As result, the necessary time for aborting the flying operation can be halved since in an extreme case in the method described with respect to conditions b) at least one flying aircraft has to fly along the entire or virtually the entire distance of the flight route until a handling station with a parking location is reached, whereas in the procedure described with respect to condition c) it is sufficient to travel along at maximum half of the flight route of the affected flight route.

However, in this mode some aircraft will have to reverse their flying direction so that in the case of air routes which are configured in a bidirectional fashion a parallel flying operation is necessary in the same direction until the flying operation is completely prohibitive. In the case of the procedure described with respect to condition b) it is possible, in contrast, to reserve the flying direction which is provided in the normal mode.

In an emergency mode, for at least a subset of the flight routes, preferably for all the flight routes, take-off processes of aircraft at the handling facilities which are connected to these flight routes are preferably stopped and the aircraft which are flying on these flight routes land at one of the handling facilities which is connected to this flight route and are transported to a free parking location at this handling facility. In this context it is, in particular, advantageous that the aircraft which has landed is transported automatically to a free parking location by a transportation device of the handling facility. As a result, there is no need for emergency personnel for parking the aircraft in the emergency mode to be provided and furthermore an efficient and rapid parking process can be ensured by the provision of a correspondingly configured transportation device. Such a transportation device can be embodied in a way analogous to a shelf warehouse system. In particular, such a transportation device can have one or more of the components of conveyor belts, automated gripping arms, automated transportation platforms for an aircraft or a conveying system for the suspended transportation of aircraft.

When an emergency parking capacity is provided according to the abovementioned conditions b), preferably the aircraft which are flying on flight routes affected by the emergency mode land at the envisaged handling facility in the flying direction.

When an emergency parking capacity is provided according to the abovementioned condition c), the aircraft which are flying on the flight routes affected by the emergency mode preferably land at the closer handling station of this flight route.

The control system is also advantageously embodied in such a way that an emergency which requires the fastest possible landing of the aircraft of one or more flight routes can be predefined manually and/or in an automated fashion. In such an emergency, the aircraft located on the affected flight route are landed automatically on the ground (and not at the handling facility). Such an emergency can occur, for example, if there is no possibility of landing at the handling facilities connected to the flight route or if external influences absolutely require a landing which is as fast as possible.

In one advantageous embodiment of the method according to the invention, particularly energy-efficient transportation of the passengers is achieved in that at least one subset of the flight routes, preferably all the flight routes, have a difference in height between the highest and the lowest point of the flight route of less than 100 m, of preferably less than 50 m, in particular less than 30 m.

This is based on the recognition that the ascent of an aircraft requires a considerable deployment of energy. Therefore it is advantageous to travel along the necessary distance of a flight route with as little need for the aircraft to ascend as possible. Such a flight route which is embodied in an energy-efficient fashion can be embodied by virtue of the fact that the two end points of the flight route have only a small difference in height, in particular within the prescribed limits. Moreover, it is advantageous to select the flight route in such a way that intermediate relatively high objects or flight restriction zones are not flown over or only flown over to a small degree.

To the extent that such flight restriction zones or objects which are to be flown over are located in the region of the transport system it is therefore advantageous to select a flight route which passes to the side of such an object or a flight restriction zone insofar as the additional expenditure of energy resulting from a lengthening of the flight route is overcompensated by the saving of energy due to the relatively small difference in height.

Alternatively or additionally it is therefore advantageous that at least one subset of the handling facilities of the transport system, preferably all the handling facilities of the transport system, has/have a take-off and landing facility for the aircraft at a height of greater than 50 m, preferably greater than 75 m, in particular greater than 100 m, above the ground. As result of the predefined take-off height and landing height it is already possible to fly over relatively low objects or flight restriction zones without it being necessary for the aircraft to ascend, or at least with only a slight ascent of the aircraft. In particular, it is therefore advantageous that the handling facilities are arranged in or preferably on high rise buildings. As result, the abovementioned multiple use of an area is also achieved so that an additional advantage with respect to the space requirement compared with previously known local transport systems is already obtained.

For the abovementioned reasons, the take-off and landing facilities of the handling facilities, in particular preferably of all the handling facilities, preferably have a height difference which is of less than 50 m, preferably of less than 25 m, and in particular of less than 10 m.

In one advantageous development of the method according to the invention, at least one on-demand handling facility is provided which is connected by at least one on-demand flight route to a handling facility. In this context, an aircraft flies on the on-demand flight route to the on-demand handling facility only according to demand, in particular when requested manually by a passenger. This advantageous configuration therefore permits destination points which are only flown to rarely to be integrated into the transport system. It is typically not economically appropriate to provide continuous air traffic for such destination points due to the low demand. Nevertheless, by manually predefining such a destination point it is possible, as an exceptional situation, to steer an aircraft from a handling facility away from the flight routes with continuous air traffic on the abovementioned on-demand flight route in an automated fashion to the on-demand handling facility, preferably by the control system of the transport system.

Such on-demand handling facilities can be provided, for example, on private houses on which there is only rarely a demand for passenger transportation. With this advantageous embodiment it is therefore possible to integrate individual traffic into the transport system with flight routes which are used continuously.

In the normal mode there will typically be a constant demand for transportation so that generally there is always a passenger ready to take an aircraft which is taking off. If there is no passenger ready and nevertheless an aircraft should take-off due to a predefined standard take-off frequency or due to a predefined standard distance from the aircraft flying immediately ahead, in a local and temporary departure from the normal mode it is possible to dispense with a take-off of an aircraft. This provides the advantage that there is no demand for energy and also no wear incurred as result of an aircraft which is flying empty. However, the disadvantage arises that the average number of aircraft at the handling facilities changes as result of such a local interruption in the continuous flying operation. It is therefore necessary to compensate by providing parking locations and/or by locally omitting take-offs of aircraft which are flying to these handling stations. It is therefore advantageous that aircraft take-off continuously with or without passengers at the handling facilities.

In one advantageous development of the method for operating a transport system for passenger transportation, an acceptance procedure is provided for an external aircraft. In this context, the external aircraft is integrated into the automatic flight on a flight route. In this advantageous embodiment, the possibility is therefore provided that an aircraft which is not yet located in the transport system, in particular an aircraft which is not monitored or controlled by a control system of the transport system, is integrated into the transport system. Such an external aircraft can be, for example, a manually flown aircraft or an aircraft which is controlled by an external control system.

In order to integrate such an external aircraft, the continuous flying operation is preferably temporarily interrupted by prohibiting the take-off of an aircraft, so that the external aircraft can be integrated at the position on the flight route which now becomes free. An aircraft is advantageously intermediately parked at a parking location at the handing station at which the take-off of an aircraft has been prohibited for the purposes of integrating the external aircraft.

Furthermore it is advantageous that this aircraft, or another parked aircraft, is integrated again into a flight route when the external aircraft which has previously been integrated into the system exits the system again.

Particularly convenient use of the transport system is achieved in one advantageous embodiment of the method according to the invention in that a destination handling facility of a passenger is detected and the aircraft of this passenger is controlled in an automated fashion to the destination handing facility. This can be done by just one flight route insofar as the take-off handing facility and destination handling facility are directly connected by a flight route or by a plurality of flight routes connected in succession. In the latter case it is advantageous that optimized successive connection of flight routes is determined in an automated fashion, preferably by the control system of the transport system for passenger transportation. In this context, the total distances as well as any local disruption which may be present on flight routes which lead to a temporary suspension of the flying operation are preferably taken into account.

The passenger preferably also reaches the destination via a plurality of flight routes without changing aircraft in that the aircraft of this passenger lands intermediately at the handing facilities along the entire flight route but continues its travel on the entire flight route again, if appropriate after automatic servicing as described below. Likewise, the scope of the invention includes the fact that such a passenger changes into another aircraft at a handling station.

In the method according to the invention, between two flight routes an aircraft is at least briefly located in a handling facility. While an aircraft is at a handling station, the aircraft is advantageously serviced and/or supplied with energy, in particular the aircraft's accumulator battery is charged or exchanged. This ensures the continuous availability of the aircraft for the transport system.

In one development of this concept there can be provision without restriction that the at least one of the following stations has:

A removal station for removing at least one energy supply unit of the aircraft, in particular an accumulator battery; an insertion station for inserting at least one energy supply unit of the aircraft, in particular an accumulator battery; charging station for charging or topping up at least one energy supply unit of the aircraft, in particular an accumulator battery or a fuel cell or an internal combustion engine; an entry station for passengers to enter the aircraft; an exit station for passengers to exit the aircraft; a loading station for material for transportation to be loaded into the aircraft; an unloading station for removing material for transportation to be unloaded from the aircraft; servicing station for the technical servicing of the aircraft; one or more transportation stations for transporting the aircraft to a take-off location and/or landing location; an extraction station for extracting the aircraft from the transportation device; an input station for inputting an aircraft into the transportation device.

In transport systems for passengers there is typically a spatially non-homogeneous demand for transportation capacity which also changes over time: for example as result of commuter traffic there is usually a need for a higher transportation capacity from the periphery of a transport system to its center in the morning than in the opposite direction. In the evening there is a reversed requirement:

here a higher transportation capacity is necessary from the center of the periphery than in the opposite direction.

In one advantageous development, allowance is made for such an asymmetrical demand of transportation capacity in that for predefined time windows there is increased transportation in the desired direction, in particular by an increased take-off frequency and/or a reduced distance from the aircraft flying directly ahead in the desired flying direction, in order to achieve an increased transportation capacity for passengers. For this purpose, on the flight routes which are embodied in a bidirectional fashion an asymmetrical take-off frequency and/or an asymmetrical minimum distance from the aircraft flying immediately ahead are/is advantageously predefined so that a higher transportation capacity is achieved in the desired direction on this bidirectional flight direction than in the opposing direction.

This advantageous refinement duly has the advantage that there is a saving in energy as result of demand-appropriate adaptation of the transportation capacity. At the same time, however, such a refinement results in an accumulation of aircraft in the area at which increased transportation capacity is implemented. In the example of commuter traffic, in the morning the average number of aircraft is therefore shifted from the periphery of the transport system to the center of the transport system. The handling facilities in the center of the transport systems therefore have to have an increased parking capacity, since the handling facilities which are located in the center will be flown to by more aircraft when averaged over time than by aircraft which fly away from them. Correspondingly, in the evening an increased parking capacity has to be provided at the handling facilities at the periphery of the transport system, since when the evening reversal of the commuter traffic occurs more aircraft land than take-off at these handling facilities at the periphery when averaged over time.

In one advantageous development of the invention, a minimum number of free parking locations for fleet relocations are therefore kept available for a multiplicity of the handling facilities, preferably for all the handling facilities.

As described above it is advantageous here firstly to provide, given a known increased transport demand, additional aircraft at the handling facilities in the take-off region of the increased transport demand and, on the other hand, to provide additional free parking locations for the fleet relocation at the handling facilities in the destination area of the increased transportation demand. This permits a temporary asymmetrical delivery capacity.

In one advantageous development of the method, at least one subset of the handling facilities is connected to a plurality of adjacent handling facilities, preferably to all the adjacent handling facilities, in each case via a flight route. As a result of this advantageous dense networking of the handling facilities it is possible to serve any desired route within the system on the shortest possible connecting paths.

In order to ensure a connection of any arbitrary pair of handling facilities of the transportation system, each pair of handling facilities is advantageously connected to one another at least directly via flight routes.

In the normal mode, at least for a subset of the handling facilities, preferably for all the handling facilities, a take-off frequency and/or a landing frequency are/is advantageously predefined in the range from one second to 30 minutes, preferably in the range from one second to five minutes, preferably in the range from one second to 60 seconds, most preferably at approximately 30 seconds. This ensures efficient capacity utilization, in particular with the aircraft which are already available. Additionally or alternatively it is advantageous that in the normal mode, at least for a subset of the handling facilities, preferably for all the handling facilities for the aircraft routes, in each case a distance of an aircraft from the aircraft flying ahead is predefined in the range from 10 m to 2 km, preferably 50 m to 1 km, in particular 100 m to 800 m, and preferably approximately 550 m.

The flight routes preferably have a length of less than 100 km, preferably less than 50 km, in particular less than 25 km. This reduces, in particular, the technical requirements for the energy capacity of the aircraft.

Since take-off processes and landing processes have comparatively high requirements in terms of time and energy compared to a continuous flight on a flight route, it is advantageous for an efficient embodiment of the transport system that the handling facilities are at least 500 m, preferably at least 1 km, in particular at least 5 km, apart from one another.

In particular it is advantageous that the average distance between the handling facilities of the transport system is in the range from 2 km to 20 km, in particular 5 km to 15 km, and is preferably approximately 10 km.

In one advantageous embodiment of the transport system, at least a subset of the handling facilities, preferably all the handling facilities, has/have servicing facilities for servicing, repairing and/or supplying energy to the aircraft. In particular it is advantageous that the handling facilities for each servicing facility have a transportation device for the automated transportation of the aircraft between the servicing facility and take-off location and/or landing location.

The handling facilities can have an area which serves both for the take-off and for the landing of the aircraft. In one advantageous development, the take-off frequency and landing frequency of the handling facilities is increased by providing a take-off and a separate landing area. A further increase in the take-off capacity and landing capacity of a handling area is advantageously made possible by additional take-off areas and landing areas.

In the transport system according to the invention, a multiplicity of handling facilities are connected by flight routes for aircraft. In one advantageous refinement of the transport system, this fact is used to sense ambient conditions:

The scope of the invention includes the fact that the control system is connected to external sensors and/or information sources for ambient conditions, in particular to data bases of weather services. Alternatively and/or additionally, at least a subset of the aircraft, preferably all the aircraft, has/have sensors for sensing ambient conditions, in particular one or more of the sensors: fire detector and/or smoke detector, wind detector, precipitation detector.

In this advantageous refinement, the spatial coverage of the area of the transport system by the aircraft flying on the flight routes is therefore utilized to obtain information about the ambient conditions. The sensors are advantageously connected to the control system of the transport system here, and the control system is preferably designed to derive ambient conditions in an automated fashion from the sensor data of the aircraft and to detect in an automated fashion such ambient conditions at which it is necessary to interrupt the flying operation and therefore to trigger the previously described emergency mode. In particular, the control system preferably has for this purpose the flight monitoring system which has already been mentioned.

Furthermore it is advantageous that the control system is also designed to sense the spatial extent of such ambient conditions which require temporary suspension of the flying operation. In this advantageous embodiment, the control system therefore determines individually for each flight route whether it is necessary to suspend the flying operation due to the unfavourable ambient conditions, making it possible to initiate the emergency mode in a way which is adapted to the ambient conditions and is nevertheless minimized spatially.

The sensor data of the aircraft is therefore advantageously passed on to the specified flight monitoring system of the control system of the transport system.

Basically, the transport system according to the invention for passenger transportation can be scaled as desired by providing a corresponding number of handling facilities and aircraft. Typical variables are given below, on the basis of the provision of a transport system according to the invention for passenger transportation for a densely populated area, in particular a large city, and on the basis of the technical data which are obtained by aircraft, in particular multicopters, which are already present, or on the basis of the technical data which it will be possible to obtain within a foreseeable time.

copters, aircraft with tilt wings or aircraft with a tilt rotor. Likewise, the scope of the invention includes using aircraft of different aircraft types for the method and/or the transport system.

The aircraft are preferably embodied as multicopters, in particular electric multicopters. Multicopters provide particular advantages with respect to the maneuverability and possibility of external control by an automated control system.

BRIEF DESCRIPTION OF THE DRAWINGS

Further properties and advantages of the invention result from the description of an exemplary embodiment on the basis of the drawing.

FIG. 1 shows a schematic illustration of an exemplary embodiment of a transport system according to the invention for passenger transportation.

DETAILED DESCRIPTION

The transport system 1 has a multiplicity—here over 1000—of vertical take-off and vertical landing aircraft, in

| Variable | Typical value range | Exemplary value |
| --- | --- | --- |
| Area coverage 200 km² to 2000 km² | 100 km² to 10 000 km² | 30 km × 20 km (600 km²) |
| Average distance between handling facilities | 5 km to 25 km | 10 km |
| Average flight speed of aircraft | 50 km/h to 200 km/h | 75 km/h |
| Average number of aircraft simultaneously in the air in normal mode | 100 to 3000 | 750 |
| Accumulator capacity of aircraft | 0.5 h to 4 h flying time including 5 to 40 take-offs/landings | 1 h flying time including 10 take-offs/landings |
| Number of exchangeable accumulators kept available at each handling facility | 200 to 2000 | 600 |

The handling facilities are preferably embodied as in PCT/EP2017/068602. Additionally or alternatively it is advantageous to embody the handling facilities as take-off facility/landing facility according to PCT/EP2017/068628.

The aircraft of the method according to the invention and of the transport system according to the invention are suitable for transporting passengers and preferably have at least one seat, in particular preferably at least two seats, for passengers. The aircraft of the method according to the invention and of the transport system according to the invention are designed so as to be suitable for vertical take-off and vertical landing. This property is also referred to as v.t.o.l. (vertical take-off and landing).

The aircraft are preferably of electrical design, i.e. the thrust which is necessary to move the aircraft is preferably achieved by one or more electric motors. As result environmentally friendly operation is possible.

The electrical energy is preferably made available by an accumulator. As result, a rapid supply of energy can be provided by charging and/or exchanging the accumulator. Likewise, other energy sources such as, for example, fuel cells, electric generators based on internal combustion engines or a combination thereof lie within the scope of the invention.

Likewise, other drive possibilities, in particular internal combustion engines, are also included within the scope of the invention.

The aircraft are preferably embodied as a multicopter, in particular Volocopter® (IR 1251865) of the applicant, helithis case electric multicopters for passengers. These multicopters are embodied as Volocopters® from evolo GmbH. By way of example two multicopters 2a, 2b of the transport system are presented. Likewise, the aircraft can be embodied as helicopters or as aircraft with tilt wings or tilt rotors or a mixture thereof in further exemplary embodiments.

The transport system 1 also has a multiplicity of handling facilities 3a, 3b which are designed for the take-off and the landing of the multicopters 2a, 2b. Each handling facility has parking locations for a multiplicity of multicopters.

Furthermore, the transport system 1 has a control system (not illustrated) with a computer with a data memory. This control system is connected to the handling facilities 3a, 3b and in a wireless fashion to the multicopters 2a, 2b. The control system is designed for automated take-off and automated landing of the multicopters 2a, 2b at the handling facilities 3a, 3b and for automated steering of the multicopters along predefined flight routes between the handling facilities. The multicopters each have GPS receivers whose data is passed on to the control system. As result, automated flight on flight routes which are predefined by the control system is made possible. Likewise, the multicopters may have further or other sensors/detectors for determining locations and positions.

In the present exemplary embodiment, each handling facility 3a, 3b is connected to each adjacent handling facility 3a, 3b via a flight route in each case. The flight routes are illustrated as dashed lines. By way of example, a flight route is characterized by the reference number 4.

The control system is designed for continuous air traffic of the multicopters 2a, 2b on the flight routes 4. Therefore, take-off and/or landing of a multicopter occurs in a continuous sequence at each of the handling facilities 3a, 3b.

The transport therefore permits transportation of passengers in the area which is covered by the transport system, wherein there is no need for infrastructure in the form of roads and rails between the handling facilities.

For reasons of simpler illustration, the handling facilities 3a, 3b in FIG. 1 are each arranged at an intersection point of a rectangular grid, i.e. the flight routes extend in a perpendicular or parallel fashion with respect to one another. Typically, when implementing such a transport system it is necessary to take into account further conditions such as, for example, points with increased passenger volume (for example handling facilities at or in the vicinity of train stations) or natural conditions or flight restriction zones (for example in the vicinity of hospitals), so that typically a right-angled network is not embodied.

The handling facilities 3b are each embodied as a handling facility according to PCT/EP2017/068602. They can preferably comprise a building here, as shown in FIGS. 6 and 7 of the abovementioned reference and explained the associated description of the figures. Likewise, the handling facilities can also be arranged on separate support structures which, if appropriate, span existing infrastructure, such as for example existing buildings, in particular train stations or multi-storey car parks for cars.

The handling facilities 3a and 3b have take-off and landing facilities for the multicopters here at a height between 90 and 110 meters above the ground. The average flying height on the flight routes is approximately 130 meters above the ground. Therefore, the difference in height between the highest and lowest point of the flight route for all the flight routes is less than 50 meters (maximum 40 meters), so energy-efficient operation is achieved.

All handling facilities 3a, 3b have servicing facilities for the automatic exchange of storage batteries of the multicopters. Furthermore, all handling facilities 3a, 3b have automated transportation facilities in the form of transportation belts by which a landed multicopter can be transported from the landing location of the handling facility to the servicing facility and from the servicing facility to a take-off location or to a free parking location of the handling facility. The exchange of the accumulator battery of the multicopter for a fully charged accumulator battery is performed in automated fashion in the servicing facility. The removed accumulator battery is automatically fed to a charging station for the accumulator battery.

The handling facilities 3a, 3b furthermore have facilities for enabling passengers to disembark from and embark into the multicopters. In particular, access facilities as described in PCT/EP2017/068602 may be provided.

All multicopters 2a, 2b of the transport system have sensors for sensing ambient conditions; in the present case, each multicopter respectively has a fire detector, a smoke detector, a wind detector and a precipitation detector. The measurement data from these sensors are transmitted to a flight monitoring system of the control system of the transport system.

The flight monitoring system evaluates the measurement data in an automated fashion. When a hazardous situation is present, in particular if predefined limiting parameters, for example for a windspeed or a quantity of precipitation, are exceeded, the flight monitoring system identifies in an automated fashion those flight routes which are to be temporarily suspended due to the critical ambient conditions.

Likewise, the flight monitoring system releases the affected flight routes again for the normal mode when a hazardous situation is no longer detected.

During normal operation, the transport system is in a normal mode in which the continuous flying operation of the multicopters takes place on the flight routes by the control system. When a hazardous situation such as described above occurs for the affected flight routes 4, the normal mode is ended and the multicopters are landed in an automated fashion. For this purpose, in the normal mode each handling facility continuously has emergency parking capacity at free parking locations:

In the present exemplary embodiment, the emergency parking capacity of a handling facility results from the number of all the multicopters flying simultaneously to this handling facility on a flight route of this handling facility.

As is apparent in FIG. 1, the handling facilities 3a are each connected to two flight routes, each of the outer handling facilities 3b to three flight routes, and each of the two inner handling facilities 3b to four flight routes. All the flight routes in this exemplary embodiment are embodied in the normal mode as bidirectional, symmetrical flight routes. In the case of the flight route 4, it is illustrated by way of example that the multicopter 2a moves from the right-hand handling facility to the left-hand handling facility of this flight route 4, sand the multicopter 2b moves in the opposite direction. This is intended to indicate that on such a bidirectional flight route multicopters travel continuously in both directions between the handling facilities which are connected to this flight route.

The abovementioned condition for an emergency parking capacity then means, for example for one of the two inner handling facilities 3b, that at any point in time in the emergency mode on a total of flight routes multicopters which are flying to this handling facility are "in the air". The total number of these multicopters flying to this handling facility on the four flight routes results in the emergency parking capacity for this handling facility. The same applies to the handling facilities which are connected to three or to two flight routes.

In a hazardous situation, as described above normal mode is ended by the control system for the respective flight route. This means that at the two handling facilities which are connected to this flight route multicopters no longer take off at this flight route. If, for example, a hazardous situation has been detected for the flight route 4, multicopters no longer take off on the flight route 4 and the handling facilities 3b which are connected to the flight route 4. If other flight routes which are connected to this handling facility 3b are not affected by the hazardous situation, multicopters can take off for these flight routes from the handling facilities according to the normal mode.

The hazardous situation described above in the region of flight route 4 therefore leads to a situation in which no further take-offs take place for the flight route 4. However, there are typically still flight routes in flight on the flight route 4. In the present exemplary embodiment, all these multicopters 2a, 2b end their flight along the flight route 4 and in the original flying direction. The provision of emergency parking capacities according to the abovementioned condition ensures that there are parking locations at the respective destination handling facilities 3b for all the multicopters which are on the flight route 4. After a multicopter lands, the multicopter is transported automatically to a free parking location by a conveyor belt.

The transport system according to the exemplary embodiment illustrated in FIG. 1 also has an on-demand handling facility 5. This is connected to one of the flight routes of the transport system via an on-demand flight route 5a. However, the on-demand flight route 5a does not have any continuous air traffic. Such air traffic takes place only on demand by a user. The on-demand handling facility 5b could be arranged, for example, on or at a private residence so that air traffic is desired only for passenger transportation to the private residence.

A user can then enter the on-demand handling facility 5 as a destination when employing a multicopter which is in the continuous flying operation. Since a private residence is involved, such a destination input is possible only by additionally inputting a password or comparable identification by means of, for example, an RFID chip or other identification measures.

The control system then directs the respective multicopter in an automated fashion onto the on-demand flight route 5a and causes it to land at the on-demand handling facility 5. This therefore results in a gap on the usual flight route which can be maintained or closed again by a parked multicopter in automated fashion by the control system of the next handling facility. The multicopter which is parked at the on-demand handling facility 5 can then be returned with or without passengers to the usual flight routes: in response to a corresponding request or release by the user the control system prohibits a take-off on the corresponding usual flight route so that a gap is produced on this flight route, which gap is filled again by the abovementioned multicopter via the on-demand flight route 5a so that the multicopter is returned to the usual flight routes.

FIG. 1 also illustrates an external multicopter 6. The latter is per se not a component of the transport system. For example, the external multicopter 6 is a private multicopter which is flown manually. Likewise, the external multicopter 6 can be a multicopter, which is controlled in an automated fashion, of an adjacent transport system and can therefore be located on a flight route of the adjacent transport system. In order to integrate the external multicopter 6, firstly a request is sent to the control system, similarly to the way described above with respect to the on-demand flight route 5a, said request being initiated by the user and/or a further control system of the external transport system. A gap on the respective usual flight route of the transport system, into which gap the 4 external multicopter 6 is integrated, is formed by omitting the take-off of a multicopter. After the integration, the control system of the transport system assumes the control of the external multicopter 6. Starting from this point in time, the external multicopter 6 therefore behaves in a way identical to the usual multicopters 2a, 2b and is also controlled exclusively via the control system of the transport system.

In reverse sequence, the external multicopter 6 can exit the transport system, wherein the gap which is produced as a result can also be filled by a parked multicopter here in a way analogous to the abovementioned described on-demand flight route 5a.

In the present exemplary embodiment, the handling facilities for each flight route which is connected to the handling facility each have a take-off location and a landing location. In the normal mode, the control system predefines a take-off frequency of 30 seconds, i.e. in the normal mode a multicopter takes off every 30 seconds on each flight route and in each flying direction.

The handling facilities 3a, 3b have to a certain extent free parking locations for fleet relocations in addition to the free parking locations described above according to the emergency parking capacity.

In the typical take-off area, there is in the morning, for example between 7 am and 9 am an increased passenger transportation demand from the periphery into the center, and in the present exemplary embodiment an increased passenger transportation demand is assumed between 7 am and 9 am starting from vertices of the transport system (handling facilities 3a to the two inner handling facilities 3b, which are each connected to four flight routes. Correspondingly, an increased passenger transportation demand from the two abovementioned inner handling facilities 3b to the handling facilities 3a is assumed in the evening between 5 pm and 7 pm. This results in a known fashion from the fact that residential areas are located to a greater extent in the periphery, and working areas are located to a greater extent in the center.

Each of the handling facilities 3a therefore has a fleet relocation capacity of 40 parking locations each. Correspondingly, each of the two inner handling facilities 3b has in each case a fleet relocation parking capacity of 80 parking locations. Each at the start of a day at 7 am the parking locations which are provided for the fleet relocation, of the handling facilities 3a, are filled with multicopters, i.e. at this point in time each of the handling facilities 3a has in each case 40 multicopters which are made ready on the fleet relocation parking locations. The fleet relocation parking locations of the two inner handling facilities 3b are, in contrast, free at this point in time so that a total of 163 fleet relocation parking locations are available inside the handling facilities 3b.

Operation in a modified normal mode is carried out by the control system between 7 am and 9 am. In this modified normal mode, the flight connections which start from the handling facilities 3a have an asymmetrical take-off frequency which also continues via the further flight connections up to the respective closer inner handling facility 3b. In this modified normal mode, a higher take-off frequency (for example every 20 seconds) therefore takes place on the flight routes in the direction of one of the inner handling facilities 3b than in the opposite flying direction (for example every 30 seconds). As a result, when averaged over time more multicopters land at the inner handling facilities 3b than take off at these handling facilities. The excess multicopters are parked at the free fleet relocation parking locations. Correspondingly, the fleet relocation parking locations of the handling facilities 3a become empty, since when averaged over time more multicopters take off than land at these handling facilities. With the asymmetrical take-off frequency which is mentioned by way of example a fleet contingent of 40 multicopters would therefore be relocated approximately in 40 minutes, i.e. the modified normal mode only lasts 40 minutes in this example.

Up to the ending of the modified normal mode, the control system introduces the symmetrical control described at the beginning so that there is an identical take-off frequency in both directions on each flying direction.

In turn, operation in a modified normal mode takes place by the control system in the evening between 5 pm and 7 pm. This mode corresponds to the previously described modified normal mode, but the direction of the asymmetrical control is reversed so that an increased transportation capacity is achieved from the inner handling facilities 3b to the handling facilities 3a. As a result, the fleet relocation parking locations of the inner handling facilities 3b are emptied, while the fleet relocation parking locations of the handling facilities 3a are filled. This sequence can therefore be repeated daily or preferably on any workday.

The invention claimed is:

1. A method for operating a transport system (1) for passenger transportation, comprising:
controlling by a control system a multiplicity of vertical take-off and vertical landing aircraft (2a, 2b) for passengers;
providing a multiplicity of handling facilities (3a, 3b) for the take-off and the landing of aircraft (2a, 2b), wherein each said handling facility has parking locations for a multiplicity of aircraft (2a, 2b),
configuring flight routes (4) between the handling facilities (3a, 3b) so that each said handling facility is connected to at least one further one of the handling facilities via one of the flight routes (4),
wherein continuous air traffic of said aircraft (2a, 2b) occurs on the flight routes (4), at least in one flying direction, with automated take-off, automated flight along the flight route (4) and automated landing; and
taking over control of an external aircraft (6) from an external control system, and integrating the external aircraft into the flight routes (4).

2. The method as claimed in claim 1, wherein at least one of a standard take-off frequency with which said aircraft (2a, 2b) take off in a normal mode is predefined for each said handling facility (3a, 3b), or a standard distance which represents a distance between one said aircraft (2a, 2b) and another said aircraft (2a, 2b) flying directly ahead thereof on the respective flight route (4) in a normal mode is predefined for each said flight route (4).

3. The method as claimed in claim 1, wherein at least one subset of the flight routes (4) is embodied in a bidirectional fashion.

4. The method as claimed in claim 1, wherein in a normal mode at least one subset of the handling facilities (3a, 3b) has in each case and continuously at least one emergency parking capacity at free parking locations,
which corresponds to at least one of the following conditions:
a) two of the handling facilities (3a, 3b) which are connected to one said flight route (4) have a common emergency capacity and free parking locations which corresponds to at least the number of the aircraft (2a, 2b) flying on the flight route (4) between the two handling facilities (3a, 3b);
b) the emergency parking capacity of said handling facility corresponds to the number of all the aircraft (2a, 2b) which are flying simultaneously toward said handling facility on the flight route (4) of said handling facility;
c) the emergency parking capacity corresponds to a sum of half of the number of all the aircraft (2a, 2b) which are flying simultaneously to said handling facility on the flight route (4) of said handling facility and half of the number of all the aircraft (2a, 2b) which are flying simultaneously away from said handling facility on the flight route (4) of said handling facility.

5. The method as claimed in claim 1, wherein in an emergency mode, for at least a subset of the flight routes (4), take off processes of the aircraft (2a, 2b) at the handling facilities (3a, 3b) which are connected to these flight routes (4) are stopped and the aircraft (2a, 2b) flying on these flight routes (4) land at one said handling facility which is connected to this flight route (4), and are conveyed to a free parking location of said handling facility.

6. The method as claimed in claim 5, wherein the aircraft (2a, 2b) flying on flight routes (4) which are affected by the emergency mode land at the handling facility in the flying direction, wherein the emergency parking capacity of said handling facility corresponds to the number of all the aircraft (2a, 2b) which are flying simultaneously toward said handling facility on the flight route (4) of said handling facility.

7. The method as claimed in claim 5, wherein the aircraft (2a, 2b) flying on flight routes (4) affected by the emergency mode land at the closer handling station of said flight route (4), wherein the emergency parking capacity corresponds to a sum of half of the number of all the aircraft (2a, 2b) which are flying simultaneously to said handling facility on the flight route (4) of said handling facility and half of the number of all the aircraft (2a, 2b) which are flying simultaneously away from said handling facility on the flight route (4) of said handling facility.

8. The method as claimed in claim 1, wherein at least a subset of the flight routes (4) have a difference in height between a highest and lowest point of the flight route (4) of less than 100 m.

9. The method according to claim 1, wherein at least one on-demand handling facility (5) is provided which is connected by at least one on-demand flight route (5a) to a handling facility, wherein the aircraft (2a, 2b) flies on the on-demand flight route (5a) to the on-demand handling facility (5) only according to demand, when requested manually by a passenger.

10. The method as claimed in claim 1, wherein the aircraft (2a, 2b) take-off continuously with or without passengers at the handling facilities (3a, 3b).

11. The method as claimed in claim 1, further comprising providing an acceptance procedure for the external aircraft (6), and a take off of one of the aircraft (2a, 2b) at the handling facility of said flight route (4) is prohibited or delayed and the external aircraft (6) is integrated into the flight route (4) instead.

12. The method as claimed in claim 1, wherein a destination handling facility of a passenger is detected, and the aircraft (2a, 2b) of this passenger is steered in an automatic fashion to the destination handling facility via one or a plurality of successive routes (4).

13. The method as claimed in claim 1, wherein while one of the aircraft (2a, 2b) is present in one of the handing facilities, the aircraft (2a, 2b) is at least one of serviced or supplied with energy via an accumulator battery of the aircraft (2a, 2b) being charged or exchanged.

14. The method as claimed in claim 1, wherein for a multiplicity of the handling facilities (3a, 3b), a minimum number of free parking locations are kept available for fleet relocations.

15. The method as claimed in claim 1, wherein at least a subset of the flight routes (4) connect one said handling facility to an adjacent one of said handing facilities.

16. The method as claimed in claim 1, wherein at least a subset of the handling facilities (3a, 3b) is connected to a plurality of adjacent handing facilities (3a, 3b) in each case via one said flight route (4).

17. The method as claimed in claim 1, wherein each pair of the handling facilities (3a, 3b) are connected to one another at least indirectly via the flight routes (4).

18. The method as claimed in claim 1, wherein at least one of in a normal mode, at least for a subset of the handling devices (3a, 3b), a take-off frequency in a range from 1 s to 30 min, is predefined, or in the normal mode, at least for a subset of the handling facilities (3a, 3b), in each case a distance between one said aircraft (2a, 2b) and the aircraft (2a, 2b) flying ahead is predefined in the range from 10 m to 2 km for the flight routes (4).

19. The method as claimed in claim 1, wherein the flight routes (4) have a length which is less than 100 km.

20. A transport system (1) for passenger transportation, comprising:
- a multiplicity of vertical take-off and vertical landing aircraft (2a, 2b) for passengers;
- a multiplicity of handling facilities (3a, 3b) for the take-off and the landing of aircraft (2a, 2b), wherein each said handling facility has parking locations for a multiplicity of the aircraft (2a, 2b),
- a control system for the automated take-off and the automated landing of the aircraft (2a, 2b) at the handling facilities (3a, 3b) and for the automated steering of the aircraft (2a, 2b) along predefined flight routes (4) between the handling facilities (3a, 3b), wherein the control system is configured to control continuous flight traffic of the aircraft (2a, 2b) and the flight routes (4) and take over control from an external control system of an external aircraft (6), and integrate the external aircraft into the predefined flight routes (4).

21. The transport system (1) as claimed in claim 20, wherein for at least a subset of the handling facilities (3a, 3b), take-off facilities and landing facilities for the aircraft (2a, 2b) are arranged at a height of greater than 50 m.

22. The transport system (1) as claimed in claim 21, wherein a difference in height between the take-off facilities and landing facilities of the handling facilities (3a, 3b) is less than 50 m.

23. The transport system (1) as claimed in claim 21, wherein at least a subset of the handling facilities (3a, 3b) have servicing facilities for at least one of servicing, repairing, or supplying energy to the aircraft (2a, 2b).

24. The transport system (1) as claimed in claim 21, wherein at least a subset of the aircraft (2a, 2b) have sensors for sensing ambient conditions, including at least one of:
- fire detector;
- smoke detector;
- wind detector; or
- precipitation detector.

25. The transport system (1) as claimed in claim 24, wherein sensor data of the aircraft (2a, 2b) are passed on to a flight monitoring system of the transport system (1), wherein the flight monitoring system is configured to carry out in an automated fashion evaluation of the sensor data with respect to a presence of a hazardous situation, and when a hazardous situation is present to end the flight operation in a normal mode and to land the aircraft (2a, 2b) in an automated fashion.

* * * * *

UNITED STATES PATENT AND TRADEMARK OFFICE
CERTIFICATE OF CORRECTION

PATENT NO. : 11,735,057 B2
APPLICATION NO. : 16/633344
DATED : August 22, 2023
INVENTOR(S) : Alexander Zosel and Florian Reuter It is certified that error appears in the above-identified patent and that said Letters Patent is hereby corrected as shown below:

On the Title Page
IN THE ABSTRACT
- Column 2, Line 4: delete "handing" and insert -- handling --;
- Column 2, Line 7: delete "handing" and insert -- handling --;
- Column 2, Line 8: delete "handing" and insert -- handling --.

In the Specification
- Column 2, Line 43: delete "handing" and insert -- handling --;
- Column 3, Line 60: delete "handing" and insert -- handling --;
- Column 4, Line 21: delete "handing" and insert -- handling --;
- Column 4, Line 45: delete "handing" and insert -- handling --;
- Column 4, Line 64: delete "handing" and insert -- handling --;
- Column 8, Line 2: delete "handing" and insert -- handling --;
- Column 8, Line 14: delete "handing" and insert -- handling --;
- Column 8, Line 15: delete "handing" and insert -- handling --;
- Column 8, Line 29: delete "handing" and insert -- handling --;
- Column 16, Line 7: delete "(handling" and insert -- handling --;
- Column 16, Line 65: delete "handing" and insert -- handling --.

In the Claims
- Column 18, Line 42: in Claim 13, delete "handing" and insert -- handling --;
- Column 18, Line 52: in Claim 15, delete "handing" and insert -- handling --;
- Column 18, Line 55: in Claim 16, delete "handing" and insert -- handling --.

Signed and Sealed this
Twenty-seventh Day of February, 2024

Katherine Kelly Vidal
*Director of the United States Patent and Trademark Office*